(12) United States Patent
Luo

(10) Patent No.: US 10,409,773 B2
(45) Date of Patent: Sep. 10, 2019

(54) METHOD AND DEVICE FOR CLEANING UP TERMINAL RESOURCE AND TERMINAL

(71) Applicant: BEIJING KINGSOFT INTERNET SECURITY SOFTWARE CO., LTD., Beijing (CN)

(72) Inventor: Peng Luo, Beijing (CN)

(73) Assignee: Beijing Kingsoft Internet Security Software Co., LTD., Beijing (CN)

( * ) Notice: Subject to any disclaimer, the term of this patent is extended or adjusted under 35 U.S.C. 154(b) by 331 days.

(21) Appl. No.: 15/506,706

(22) PCT Filed: Aug. 18, 2015

(86) PCT No.: PCT/CN2015/087401
§ 371 (c)(1),
(2) Date: Feb. 24, 2017

(87) PCT Pub. No.: WO2016/029807
PCT Pub. Date: Mar. 3, 2016

(65) Prior Publication Data
US 2017/0255641 A1 Sep. 7, 2017

(30) Foreign Application Priority Data

Aug. 28, 2014 (CN) .......................... 2014 1 0433004
Aug. 28, 2014 (CN) .......................... 2014 1 0433471

(51) Int. Cl.
*G06F 13/00* (2006.01)
*G06F 16/16* (2019.01)
(Continued)

(52) U.S. Cl.
CPC ........ *G06F 16/162* (2019.01); *G06F 12/0269* (2013.01); *G06F 16/148* (2019.01);
(Continued)

(58) Field of Classification Search
CPC ............ G06F 12/0269; G06F 16/1737; G06F 16/162; G06F 16/148; G06F 16/215;
(Continued)

(56) References Cited

U.S. PATENT DOCUMENTS 7,689,510 B2 * 3/2010 Lamkin ............... G06F 16/4387
705/51
7,779,097 B2 * 8/2010 Lamkin .................. G11B 27/10
709/223

(Continued)

FOREIGN PATENT DOCUMENTS

| CN | 1920828 A | 2/2007 |
|---|---|---|
| CN | 102043655 A | 5/2011 |

(Continued)

OTHER PUBLICATIONS

Office action from SIPO dated Dec. 28, 2016 for CN application 20140433004.9.
(Continued)

*Primary Examiner* — Kenneth R Coulter
(74) *Attorney, Agent, or Firm* — Martin & Ferraro, LLP

(57) ABSTRACT

A method and device for cleaning up a terminal resource and a terminal are provided. The method includes: receiving a cleanup instruction, and acquiring a resource saved on a terminal according to the cleanup instruction; processing the resource, and saving the processed resource, in which a storage space occupied by the processed resource is less than a storage space occupied by the resource; and querying whether a resource is saved on a server, if the resource is saved on the server, displaying deletion prompt information, and deleting the resource according to an operation executed by a user.

14 Claims, 4 Drawing Sheets

(51) Int. Cl.
  *G06F 16/14* (2019.01)
  *G06F 16/17* (2019.01)
  *G06F 12/02* (2006.01)
  *H04L 29/06* (2006.01)
  *H04L 29/08* (2006.01)

(52) U.S. Cl.
  CPC .......... *G06F 16/1737* (2019.01); *H04L 29/06* (2013.01); *H04L 29/08945* (2013.01); *H04L 67/04* (2013.01); *H04L 67/125* (2013.01); *H04L 69/04* (2013.01)

(58) Field of Classification Search
  CPC ... G06F 16/27; H04L 29/06; H04L 29/08945; H04L 69/04; H04L 67/04; H04L 67/125
  USPC .......................... 709/232, 230, 224, 223, 203
  See application file for complete search history.

(56) References Cited

U.S. PATENT DOCUMENTS

| | | | | |
|---|---|---|---|---|
| 8,943,027 B1* | 1/2015 | Dwan | ................... | G06F 16/215 707/664 |
| 9,129,130 B2* | 9/2015 | Sturonas | ............. | H04L 63/1466 |
| 9,253,166 B2* | 2/2016 | Gauda | ................. | G06F 21/6218 |
| 9,639,711 B2* | 5/2017 | Sturonas | ............. | H04L 63/1466 |
| 9,876,637 B2* | 1/2018 | Gauda | ................. | G06F 21/6218 |
| 2006/0161635 A1* | 7/2006 | Lamkin | ............... | G06F 16/4387 709/217 |
| 2013/0305039 A1* | 11/2013 | Gauda | ................. | G06F 21/6218 713/153 |
| 2014/0297586 A1* | 10/2014 | Kim | ................... | G06F 16/1827 707/610 |
| 2016/0378797 A1* | 12/2016 | Dwan | ................... | G06F 16/215 707/692 |

FOREIGN PATENT DOCUMENTS

| | | |
|---|---|---|
| CN | 102129380 A | 7/2011 |
| CN | 103092650 A | 5/2013 |
| CN | 103124276 A | 5/2013 |
| CN | 103139264 A | 6/2013 |
| CN | 103167134 A | 6/2013 |
| CN | 103281350 A | 9/2013 |
| CN | 103309729 A | 9/2013 |
| CN | 103631603 A | 3/2014 |
| CN | 103645914 A | 3/2014 |
| CN | 103942067 A | 7/2014 |
| CN | 104182532 A | 12/2014 |
| CN | 104199913 A | 12/2014 |

OTHER PUBLICATIONS

English translation of office action from SIPO dated Dec. 28, 2016 for CN application 201410433004.9.
Office action from SIPO dated Aug. 11, 2017 for CN application 201410433004.9.
English translation of office action from SIPO dated Aug. 11, 2017 for CN application 201410433004.9.
ISR and written opinions for PCT application CN2015087401.
English translation of the written opinions for PCT application CN2015087401.
English translation of the ISR for PCT application CN2015087401.
Office action front SIPO for CN application 201410433004.9, dated Jan. 29, 2018.
English translation of office action from SIPO for CN application 201410433004.9, dated Jan. 29, 2018.

\* cited by examiner

METHOD AND DEVICE FOR CLEANING UP TERMINAL RESOURCE AND TERMINAL

CROSS-REFERENCE TO RELATED APPLICATION

This application is a National Phase Application under 35 USC 371 of PCT/CN2015/087401 filed Aug. 18, 2015 (published on Mar. 3, 2016 as WO 2016/029807); which claims priority to and benefits of Chinese Patent Application Serial No. 201410433004.9, entitled "method and device for cleaning up terminal file and terminal", and Chinese Patent Application Serial No. 201410433471.1, entitled "method and device for cleaning up terminal resource and terminal", filed with the State Intellectual Property Office of P. R. China on Aug. 28, 2014, the entire content of which is incorporated herein by reference.

FIELD

The present disclosure relates to a field of mobile communication technology, and more particularly relates to a method and a device for cleaning up a terminal resource, and a terminal.

BACKGROUND

With the development of science and technology, a terminal (such as a phone or a tablet computer) has more and more functions, such that more and more resources required to be stored in the terminal and the data size of each resource stored in the terminal has become lamer and larger. The resource may be an audio, a video, an image or the like. For example, the data size of an image may be 2 MB, and the data size of a video may be 1 GB. However, the storage space of the terminal is limited, with the increasing of resource stored in the terminal by a user, the storage space would be occupied by a large amount of resources. As a result, the available storage space in the terminal has become lesser and lesser.

At present, a user may delete the resource in a terminal or move the resource stored in the terminal to a storage device other than the terminal manually to reduce the resource occupancy of the storage space of the terminal. For example, when a terminal is a smart phone based on Android system and the memory of the smart phone is insufficient, the user may move the resource stored in the smart phone to a computer after the smart phone is connected to the computer. Deleting or moving the resource may reduce the resource occupancy of the storage space of the terminal, however, the user may not view the deleted or moved resource through the terminal any more, which may lead to an influence on the user's experience. Moreover, if the above method of reducing resource occupancy of the storage space of the terminal is user, the operation is complex and misoperation may occur. As a result, the resource in the terminal may be deleted by mistake.

SUMMARY

Embodiments of the present disclosure seek to solve at least one of the problems existing in the related art to at least some extent. Accordingly, a first objective of the present disclosure is to provide a method for cleaning up a terminal resource. By means of the method, the storage space of the terminal occupied by a resource can be greatly reduced, and at the same time, convenience can be provided for a user to redisplay the resource since it is guaranteed that the corresponding resource is stored in a server before the resource is deleted.

A second objective of the present disclosure is to provide a device for cleaning up a terminal resource.

A third objective of the present disclosure is to provide a terminal.

In order to achieve the above objectives, embodiments of a first aspect according to the present disclosure provide a method for cleaning up a terminal resource. The method includes: receiving a cleanup instruction, and acquiring a resource stored in a terminal according to the cleanup instruction; processing the resource, and storing a processed resource, in which a storage space occupied by the processed resource is less than that occupied by the resource; and querying whether the resource is stored in a server, if the resource is stored in the server, displaying a deleting prompt message, and deleting the resource according to an operation executed by a user.

In order to achieve the above objectives, embodiments of a second aspect according to the present disclosure provide a device for cleaning up a terminal resource. The device includes: a processor; and a memory, configured to store instructions executable by the processor; in which, the processor is configured to: receive a cleanup instruction and to acquire a resource stored in a terminal according to the cleanup instruction; process the resource and store a processed resource, in which a storage space occupied by the processed resource is less than that occupied by the resource; query whether the resource is stored in a server, to display a deleting prompt message if the resource is stored in the server and to delete the resource according to an operation executed by a user.

In order to achieve the above objectives, embodiments of a third aspect according to the present disclosure provide a terminal. The terminal includes: a shell, a processor, a memory, a circuit board and a power supply circuit, in which the circuit board is located in a space formed by the shell, the processor and the memory are arranged on the circuit board; the power supply circuit is configured to supply power to for each circuit or component in the mobile terminal; the memory is configured to store executable program codes; the processor is configured to execute a program corresponding to the executable program codes by reading the executable program codes stored in the memory so as to: receive a cleanup instruction, and acquire a resource stored in a terminal according to the cleanup instruction; process the resource, and store a processed resource, in which a storage space occupied by the processed resource is less than that occupied by the resource; and querying whether a resource is stored in a server, if the resource is stored in the server, display a deleting prompt message, and delete the resource according to an operation executed by a user.

Additional aspects and advantages of embodiments of present disclosure will be given in part in the following descriptions, become apparent in part from the following descriptions, or be learned from the practice of the embodiments of the present disclosure.

DETAILED DESCRIPTION

Figure 1:
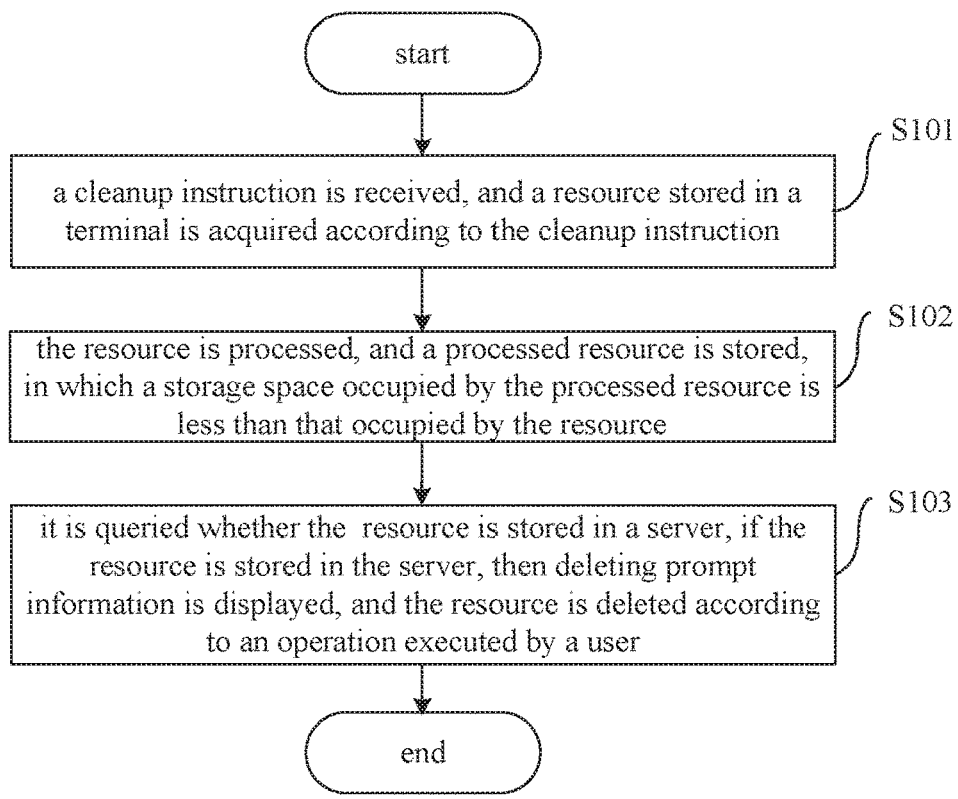
FIG. 1 is a flow chart of a method for cleaning up a terminal resource according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The method and the device for cleaning up a terminal resource and the terminal according to embodiments of the present disclosure will be described with reference to drawings.

FIG. 1 is a flow chart of a method for cleaning up a terminal resource according to an embodiment of the present disclosure. As shown in FIG. 1, the method includes the followings.

In act S101, a cleanup instruction is received and a resource stored in a terminal is acquired according to the cleanup instruction.

In an embodiment of the present disclosure, the above terminal may be a personal computer, a phone, a tablet computer or other hardware devices configured with various operating systems.

Specifically, the resource stored in the terminal under different paths may be acquired according to the cleanup instruction, after the cleanup instruction is received, in which the resource may include but is not limited to one or more of an image, an audio and a video.

In act S102, the resource is processed, and a processed resource is stored, in which a storage space occupied by the processed resource is less than that occupied by the resource.

Specifically, different types of resources may be processed in different ways after the resource stored in a terminal is acquired. Specifically, if the resource is an image, the image may be zoomed out. For example, the image may be zoomed out to acquire a thumbnail image corresponding to the image.

If the resource is an audio or a video, the audio or the video may be compressed. For example, if the resource is a 1080P high-definition video 1, the 1080P high-definition video 1 may be compressed. For example, the video 1 may be compressed to be a 480P video 1, and the processed video, i.e. the 480P video 1, may be stored in the terminal.

By processing the resource and storing the processed resource, the storage space occupied by the processed resource is far less than that occupied by the original resource, and the storage space of the terminal occupied by the resource may be greatly reduced by storing the processed resource in the terminal.

In act S103, it is queried whether the resource is stored in a server, if the resource is stored in the server, then a deleting prompt message is displayed, and the resource is deleted according to an operation executed by a user.

Specifically, after the processed resource is stored, a query request may be sent to a server according to identification information of the processed resource. The server receives the query request sent by the terminal and queries whether a corresponding resource is stored in the server according to the identification information in the query request. If there is the corresponding resource stored in the server, the querying result indicating that the corresponding resource is stored in the server may be returned to the terminal. If the terminal determines that there is the corresponding resource stored in the server according to the querying result, a deleting prompt message may be displayed on the terminal and the corresponding resource may be deleted according to the operation executed by a user.

In this embodiment, if there is no resource stored in the server, a resource may be uploaded to the server so as to ensure that the serve has the resource stored therein.

Specifically, if the corresponding resource is not found by the server according to the query request, i.e., there is no corresponding resource stored in the server, the querying result indicating that the corresponding resource is not stored in the server may be returned to the terminal. When the terminal receives the querying result and determines that the corresponding resource is not stored in the server, a processed resource may be uploaded to the server so as to ensure that the server has the processed resource stored therein.

For example, assume that the corresponding resource stored in the terminal is a 1080P high-definition video 1, and the processed resource after compression is a 480P video 1. If it is detected that the corresponding 1080P high-definition video 1 is not stored in the server, the 1080P high-definition video 1 may be uploaded to the server so as to ensure that the server has the 1080P high-definition video 1 stored therein. The prompt message of deleting the 1080P high-definition video 1 is displayed on the terminal thereafter, and at this moment, the terminal may delete the corresponding 1080P high-definition video 1 according to the operation executed by a user. Thus, before the 1080P high-definition video 1 is cleaned up, it is ensured that the original 1080P high-definition video 1 is stored in the server, such that it is convenient for the user to acquire the high-definition video from the server again when the user wants to watch the 1080P high-definition video 1 later.

Additionally, in order to ensure the security of the resource, the resource may be encrypted firstly, and then the encrypted resource may be uploaded to the server.

In this embodiment, after determining that the corresponding resource is stored in the server, a prompt message for deleting may be displayed on the terminal, and when the resource is deleted according to the operation executed by the user, a first label corresponding to the deleted resource may be generated, such that the user may trigger the first label to acquire the corresponding resource again. Thus, it is convenient for the user to acquire a rough resource from the server again and check the rough resource in anytime.

Figure 2:
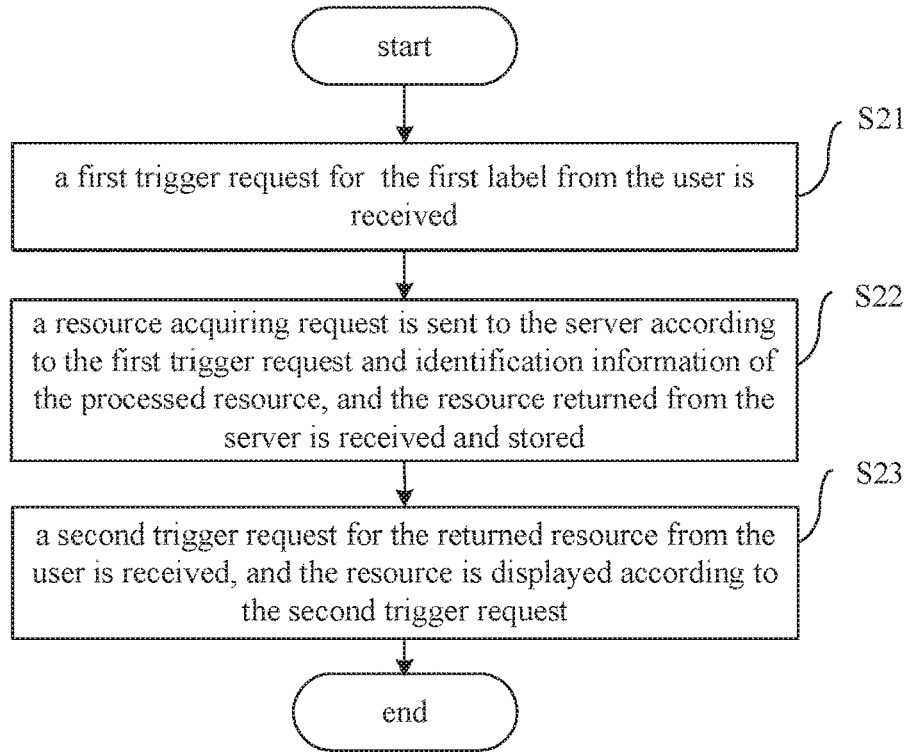
FIG. 2 is a flow chart of redisplaying a resource according to an embodiment of the present disclosure.

In this embodiment, after the first label corresponding to the deleted resource is generated, as shown in FIG. 2, if the user needs to redisplay the resource, the terminal may display the corresponding resource for the user. The redisplaying process is described as follows:

In act S21, a first trigger request for the first label from a user is received.

Specifically, when the user needs to check the rough resource, the user may trigger the first label corresponding to the resource, and the terminal receives the first trigger request for the first label corresponding to the resource from the user.

In act S22, a resource acquiring request is sent to the server according to the first trigger request and identification information of the processed resource, and the resource returned from the server is received and stored.

Specifically, a first trigger request for the first label corresponding to the resource from a user is received, and the terminal may receive identification information of the processed resource and then send a resource acquiring request containing the first trigger request and the identification information of the processed resource to the server. The server receives the resource acquiring request, acquire the resource corresponding to the processed resource according to the identification information contained in the resource acquiring request (i.e., the rough resource is acquired), and return the acquired corresponding resource to the terminal. The terminal receives and stores the rough resource returned from the server.

Additionally, if the terminal uploads an encrypted resource, the server may acquire the encrypted resource according to the resource acquiring request and return the encrypted resource to the terminal. The terminal receives the encrypted resource returned from the server and decrypts the encrypted resource through a cryptogram and stores the decrypted resource in the terminal.

For example, when a user wants to watch the 1080P high-definition video 1, after the user clicks and processes the first label corresponding to the processed 480P video 1, a terminal receives a first trigger request for the first label from the user, acquires identification information of the processed video 1, and sends a resource acquiring request containing the first trigger request and the identification information to the server. The server receives the resource acquiring request sent by the terminal, acquires the 1080P high-definition video 1 stored therein according to the identification information in the resource acquiring request, and returns the corresponding 1080P high-definition video 1 to the terminal. The terminal receives and stores the returned 1080P high-definition video 1.

In act S23, a second trigger request for the returned resource from the user is received, and the resource is displayed according to the second trigger request.

After the terminal acquires the rough resource, if a user triggers the second trigger request for the resource (i.e. a request for displaying the resource), the terminal may display the corresponding rough resource according to the trigger operation of the user. Thus, the user may redisplay the rough resource.

For example, the rough resource acquired by the terminal is a 1080P high-definition video 1, when the user clicks the 1080P high-definition video 1 stored in the terminal, the terminal may play the high-definition video 1 according to the trigger operation of the user.

Additionally, in this embodiment, if the resource is an audio or a video, after the first label corresponding to the deleted resource is generated, the resource stored in the server may be directly played on the server according to the trigger operation of the user. Specifically, the terminal receives a first trigger request for the first label from the user, plays the resource in the server according to the first trigger request and the established identification information of the processed resource. Thus, it is convenient for checking the resource stored in the server online and the terminal storage space occupied by the corresponding resource is reduced.

Additionally, in this embodiment, after the processed resource is stored, a second label corresponding to the processed resource is generated, such that the user may trigger the second label for acquiring the corresponding resource.

Specifically, in the process of checking the processed resource stored in a terminal by a user, the terminal may receive a checking request for the corresponding processed resource from the user and display the corresponding processed resource according to the checking request. In the process of checking the corresponding processed resource by the user, the terminal may receive a third trigger request for the second label corresponding to the processed resource from the user, send a resource acquiring request to the server according to the third trigger request and the identification information of the processed resource. The server may acquire the corresponding resource according to the identification information in the resource acquiring request and return the corresponding resource to the terminal. The terminal may receive and store the resource returned from the server. If the user triggers a fourth trigger request for the corresponding resource (i.e. a displaying request), the terminal may receive the fourth trigger request for the returned corresponding resource from the user, and display the corresponding resource according to the fourth trigger request. The above identification information of the processed resource may be information uniquely identifying the resource. For example, the identification information may be a name of an image, an audio and a video etc., or may be other information which could identify the resource.

For example, a 1080P high-definition video 1 is existed in a terminal, an animation file 1 may be made by using various static images in the video 1, and the animation file 1 may be stored in the terminal as a processed resource of the video 1. In the process of playing the animation file 1, if the user is interested in one of the static images, the user may click a second label in the animation file 1, and after the user clicks the second label, the terminal may acquire the 1080P high-definition video 1 for the user to watch. Specifically, the terminal may acquire the third trigger request from the user and the identification information corresponding to the animation file 1, and send a resource acquiring request to the server. The server man acquire the 1080P high-definition video 1 stored therein according to the identification information in the resource acquiring request, and return the corresponding 1080P high-definition video 1 to the terminal. The terminal may receive and store the corresponding 1080P high-definition video 1 returned from the server. When the user clicks the video 1, the terminal receives a displaying request from the user, and plays the 1080P high-definition video 1 for the user.

The method for cleaning up a terminal resource according to the above embodiment of the present disclosure may acquire a resource stored in a terminal according to the cleanup instruction, process the resource and store the processed resource which occupies a storage space less than that occupied by the resource, and query whether the resource is stored in a server, and then display a deleting prompt message if the resource is stored in the server and delete the resource according to an operation executed by a user. Thus, the storage space of the terminal occupied by a resource can be greatly reduced, and at the same time, convenience can be provided for a user to redisplay the resource since it is guaranteed that the corresponding resource is stored in a server before the resource is deleted.

Figure 3:
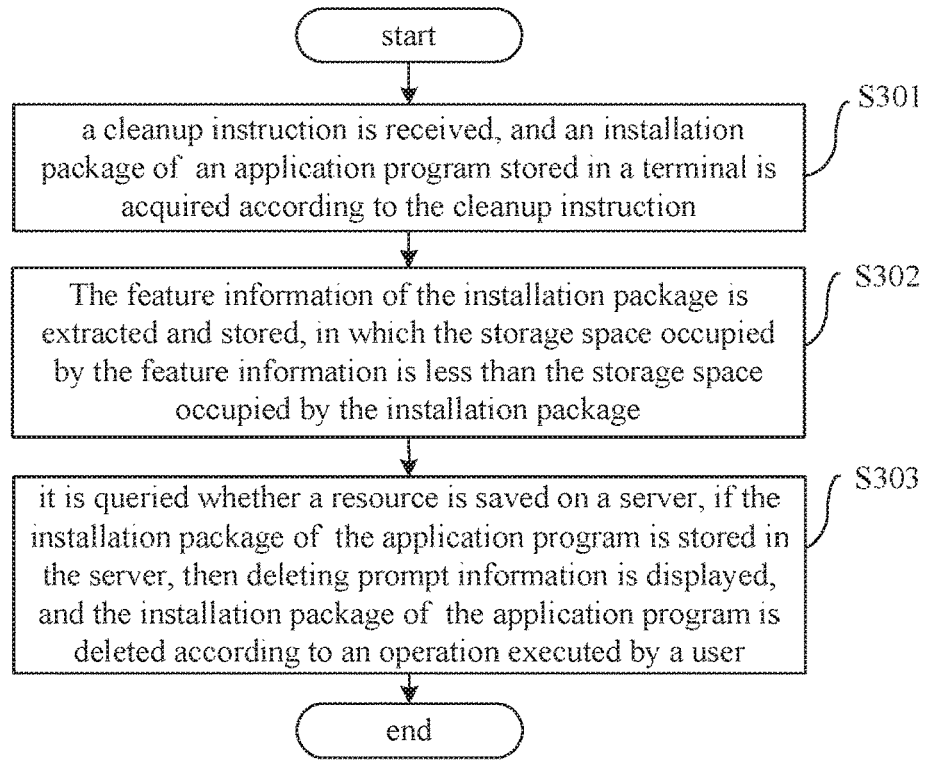
FIG. 3 is a flow chart of a method for cleaning up a terminal resource according to a specific embodiment of the present disclosure.

FIG. 3 is a flow chart of a method for cleaning up a terminal resource according to a specific embodiment of the present disclosure. In this embodiment, the resource is an installation package of an application program. As shown in FIG. 3, the method includes the followings.

In act S301, a cleanup instruction is received and the installation package of application program existed in a terminal is acquired according to the cleanup instruction.

In this embodiment, the terminal may be a personal computer, a phone, a tablet computer or other hardware devices configured with various operating systems.

Specifically, after the cleanup instruction is received, a corresponding version of installation package of the application program may be acquired through different information sources. For example, the terminal may be a smart phone base on Android system. A user downloads five application programs through Baidu application store and three application programs through SnapPea application store. After the user triggers a cleanup button, a cleanup instruction may be received, and the installation packages of the eight application programs downloaded via a management software such as Baidu application store and SnapPea application store may be acquired.

In act S302, feature information of the installation package may be extracted and stored, in which a storage space occupied by the feature information is less than that occupied by the installation package.

Specifically, after the installation package of the application program existed in a terminal is acquired, the feature information of the installation package may be directly extracted and stored, or after the installation package of the application program is installed successfully on the terminal, the feature information of the installation package may be extracted and stored, in which the feature information of the installation package includes but is not limited to one or more of name, version number, size and MD5 of the installation package, and the feature information of the installation package extracted and stored by the server only occupies dozens of bytes, and compared to the installation package of the application program which occupies several MBytes of the storage space of the terminal, the space occupancy may be reduced effectively by only storing the feature information of the application program in the terminal.

Additionally, if it is detected that the installation package of the application program is not installed, a prompt message may be displayed on the terminal such that it is convenient for user to install the corresponding application program according to the prompt message. After the corresponding application program is installed, the feature information of the installation package of the corresponding application program may be extracted and stored. However, after the prompt message is displayed on the terminal, if the user decides not to install the application program, the feature information of the installation package of the corresponding application program may be directly extracted and stored.

In act S303, it is queried whether the installation package of the application program is stored in a server, if the installation package of the application program is stored in the server, then a deleting prompt message is displayed, and the installation package of the application program is deleted according to an operation executed by a user.

Specifically, after the feature information of the installation package of the corresponding application program is extracted and stored, a querying request may be sent to the server according to the feature information of the installation package. The server receives the querying request sent by the terminal and queries whether the installation package of the corresponding application program is stored therein according to the feature information contained in the querying request, i.e., it is queried whether an installation package in accordance with the downloaded installation package is stored in the server. If the installation package of the corresponding application program is stored in the server, the querying result indicating that the installation package of the corresponding application program is stored in the server may be returned to the terminal. If the terminal determines that the installation package of the corresponding application program is stored in the server according to the querying result, a deleting prompt message may be displayed on the terminal and the installation package of the application program may be deleted according to the operation executed by a user.

In this embodiment, if the installation package of the application program is not stored in the server, the installation package of the application program may be uploaded to the server so as to ensure that the server has the installation package of the application program stored therein.

Specifically, if the installation package of the corresponding application program is not found by the server according to the querying result, which means that there is no installation package of the corresponding application program stored in the server, the querying result indicating that the installation package of the corresponding application program is not stored in the server is returned to the terminal. The terminal receives the querying result and uploads the installation package of the corresponding application program to the server when determining that the installation package of the corresponding application program is not stored in the server, so as to ensure that the server has the installation package of the corresponding application program stored therein.

For example, assume that the installation package of the corresponding application program existed in the terminal is an installation package of QQ in version 4.6.1. If it is detected that the installation package of QQ in this version is not stored, the installation package of QQ in version 4.6.1 may be uploaded to the server firstly so as to ensure the server has the installation package of QQ in this version stored therein. A prompt message of deleting the installation package of QQ may be displayed on the terminal thereafter, while the terminal may delete the corresponding installation package of QQ according to the operation executed by the user. In this way, it is guaranteed that the server has the installation package of QQ stored therein while cleaning up the installation package of QQ, such that it is convenient for the user to re-download and install the installation package of QQ in the corresponding version as needed later.

In this embodiment, after determining the installation package of the corresponding application program is stored in the server, the prompt message of deleting the installation package may be displayed on the terminal and the installation package may be deleted according to the operation executed by the user. When deleting the installation package of the corresponding application program, a label corresponding to the deleted installation package of the corresponding application program may be generated, and the user may acquire the installation package of the corresponding application program again by triggering the label corresponding to the installation package. Thus, the operation of the user for querying and downloading the installation package of the application program in a corresponding version from network may be reduced, the efficiency of acquiring by the user the installation package of the application program in the corresponding version may be improved, such that it is convenient for the user to install the application program in the corresponding version.

Figure 4:
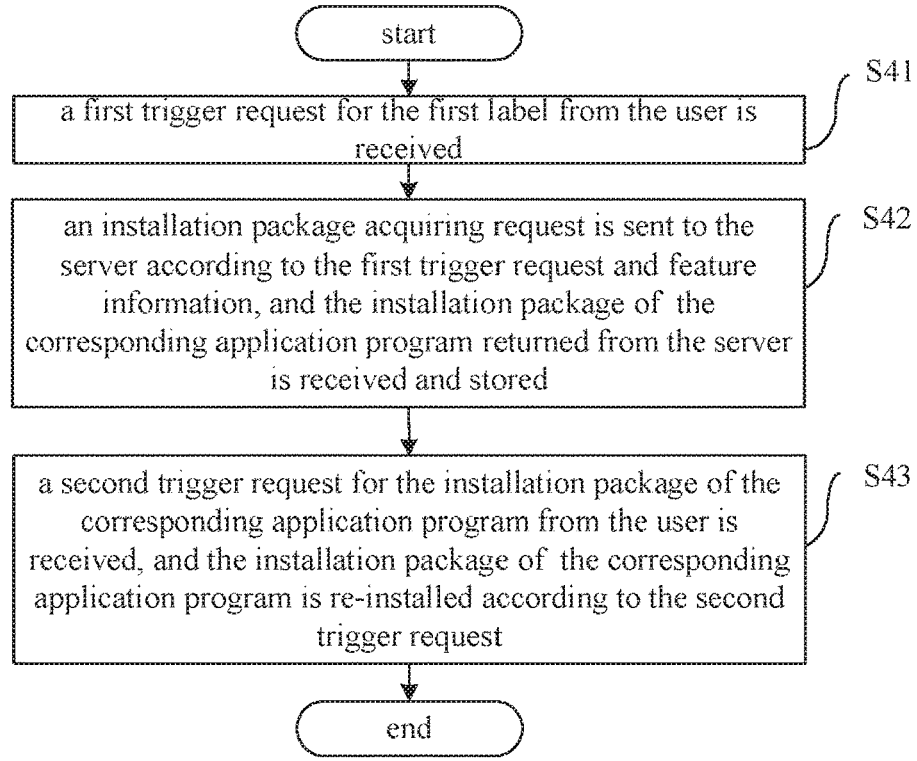
FIG. 4 is a flow chart of re-stalling an application program according to an embodiment of the present disclosure.

In this embodiment, after generating the label corresponding to the deleted installation package of the application program, as shown in FIG. 4, if a user needs to re-install the corresponding application program, the followings may be executed.

In act S41, a first trigger request for the label from a user is received.

Specifically, when the user needs to re-install an application program, a label corresponding to the application program may be triggered by the user and the terminal may receive a first trigger request for the label from the user.

In act S42, an installation package acquiring request is sent to the server according to the first trigger request and feature information, the installation package of the application program returned from the server is received and stored.

Specifically, after the first trigger request from the user is received, the terminal may acquire the feature information corresponding to the application program, and send an installation package acquiring request containing the first trigger request and the feature information to the server. The server receives the acquiring request, acquires the installation package of the corresponding application program according to the feature information in the acquiring request, and returns the installation package of the corresponding application program to the terminal. The terminal receives and stores the installation package of the corresponding application program returned from the server.

In act S43, a second trigger request for the installation package of the corresponding application program from the user is received, and the installation package of the corresponding application program is re-installed according to the second trigger request.

After the terminal acquires the installation package of the corresponding application program, if the user triggers the second trigger request (i.e. an installing request) for the installation package of the corresponding application program, the terminal may re-install the installation package of the corresponding application program according to the trigger operation of the user, so as to allow the terminal to install the application program in the corresponding version quickly. It is convenient for user to continuously experience the service provided by the application program in the corresponding version.

Additionally, in this embodiment, after the feature information of the installation package of the corresponding application program is extracted and stored, the corresponding relationship between the feature information and the installation package of the application program may be established and stored. The information of the installation package corresponding to the feature information may be acquired quickly through the established corresponding relationship. Thus, the installation package of the corresponding application program may be acquired quickly and conveniently.

Figure 5:
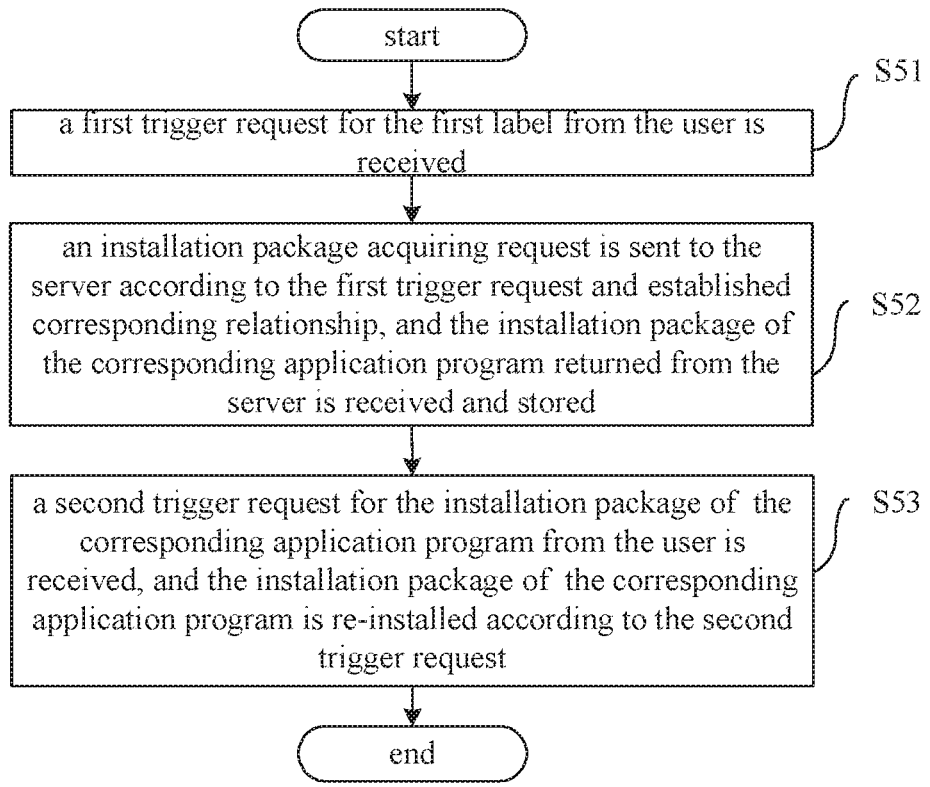
FIG. 5 is a flow chart of re-stalling an application program according to another embodiment of the present disclosure.

If the corresponding relationship between the feature information and the installation package of the application program is stored in the terminal, after generating the label corresponding to the deleted installation package of the application program, as shown in FIG. 5, the re-installation of the corresponding application program may be realized as follows.

In act S51, a first trigger request for the label from the user is received.

The act S51 is the same as the act S41, the illustration of the act S41 is suitable for the act S51, which is not described herein.

In act S52, an installation package acquiring request is sent to the server according to the first trigger request and the established corresponding relationship, the installation package of the application program returned from the server is received and stored.

Specifically, after the first trigger request from the user is received, the terminal may acquire the corresponding relationship between the feature information and the installation package of the application program, and send an installation package acquiring request to the server according to the first trigger request and the established corresponding relationship. The server receives the acquiring request, acquires the installation package of the corresponding application program according to the corresponding relationship in the acquiring request, and returns the installation package of the corresponding application program to the terminal. The terminal receives and stores the installation package of the corresponding application program returned from the server.

In act S53, a second trigger request for the installation package of the corresponding application program from the user is received, and the installation package of the corresponding application program is re-installed according to the second trigger request.

The act S53 is the same as the act S43, the illustration of the act S43 is suitable for the act S53, which is not described herein.

The method for cleaning up a terminal resource according to an embodiment of the present disclosure may acquire an installation package of an application program existed in a terminal according to the cleanup instruction, extract and store the feature information of the installation package before the installation package of the application program is cleaned up, and query whether the installation package of the application program is stored in a server. When the installation package of the application program is stored in the server, a deleting prompt message may be displayed, and the installation package of the application program may be deleted according to an operation executed by a user. Thus, the storage space of the terminal occupied by the installation package of the application program can be greatly reduced, and at the same time, convenience can be provided for a user to re-download the installation package of the application program in the same version since it is guaranteed that the installation package of the corresponding application program is stored in the server before the installation package is deleted. Thus the user's query workload may be reduced and the consistency of the installation package of the application program may be guaranteed.

In order to implement the above embodiments, the present disclosure also provides a device for cleaning up a terminal resource.

Figure 6:
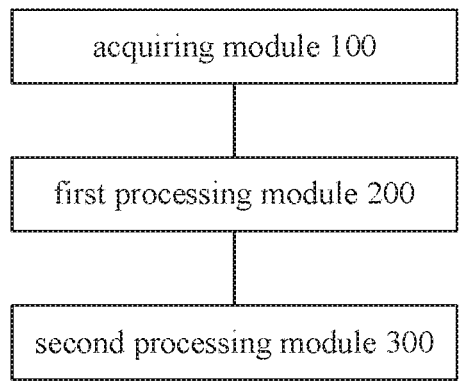
FIG. 6 is a block diagram of a device for cleaning up a terminal resource according to an embodiment of the present disclosure.

FIG. 6 is a block diagram of a device for cleaning up a terminal resource according to an embodiment of the present disclosure. As shown in FIG. 6, the device includes: an acquiring module 100, a first processing module 200 and a second processing module 300.

The acquiring module 100 is configured to receive a cleanup instruction and to acquire a resource stored in a terminal according to the cleanup instruction; the first processing module 200 is configured to process the resource and store a processed resource, in which a storage space occupied by the processed resource is less than that occupied by the resource; and the second processing module 300 is configured to query whether the resource is stored in a server, to display a deleting prompt message if the resource is stored in the server and to delete the resource according to an operation executed by a user.

The resource includes one or more of an image, an audio and a video.

The first processing module 200 may take different processing ways to deal with different types of resources. Specifically, if the resource is an image, the image may be zoomed out by the first processing module 200. Specifically, the first processing module 200 may acquire a thumbnail image corresponding to the image by zooming out the image, and store the thumbnail image corresponding to the image in the terminal.

If the resource is an audio or a video, the audio or the video may be compressed by the first processing module 200.

Figure 7:
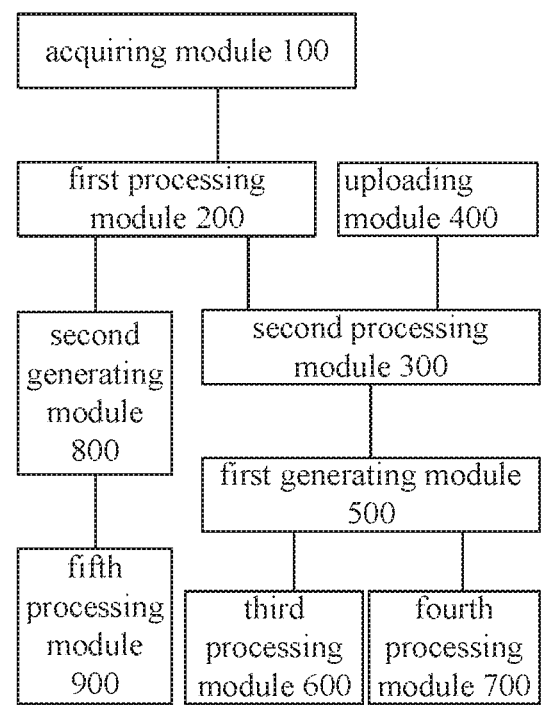
FIG. 7 is a block diagram of a device for cleaning up a terminal resource according to another embodiment of the present disclosure.

Additionally, as shown in FIG. 7, the device may also include an uploading module 400. After the second processing module 300 queries whether the resource is stored in the server, the uploading module 400 is configured to upload the resource to the server if the resource is not stored in the server so as to ensure that the user has the resource stored therein.

The uploading module 400 is specifically configured to encrypt the resource and upload the resource encrypted to the server, so as to ensure the security of resource.

In order to provide convenience for the user to check the resource stored in the server again, the device may also include a first generating module 500. The first generating module 500 is configured to generate a first label corresponding to the resource deleted, when the second processing module 300 deletes the resource, such that the user is able to trigger the first label to acquire the corresponding resource again.

The device may also include a third processing module 600. The third processing module 600 is configured to: receive a first trigger request for the first label from the user after the first generating module 500 generates the first label corresponding to the resource deleted; send a resource acquiring request to the server according to the first trigger request and identification information of the processed resource, receive and store the resource returned from the server; and receive a second trigger request for the returned resource from the user, and display the resource according to the second trigger request. Thus, the resource may be re-displayed through the third processing module 600 and it is convenient for the user to check the resource in anytime.

Additionally, if the uploading module 400 encrypts the resource when the resource is uploaded, correspondingly, the third processing module 600 may receive the encrypted resource returned from the server, decrypt the encrypted resource and store the resource decrypted.

In terms of an audio or a video, in order to provide convenience for the user for checking the resource online, the device may also include a fourth processing module 700. If the resource is an audio or a video, the fourth processing module 700 is configured to receive a first trigger request for the first label from the user after a first label corresponding to the resource deleted is generated by the first generating module 500; play the resource stored in the server according to the first trigger request and established identification information of the processed resource.

Additionally, the device may also include a second generating module 800. The second generating module 800 is configured to generate a second label corresponding to the processed resource after the first processing module 200 stores the processed resource, such that the user is able to trigger the second label to acquire the resource.

The device may also include a fifth processing module 900. The fifth processing module 900 is configured to: receive a checking request for the processed resource from the user and display the processed resource according to the checking request after the second generating module 800 generates a second label corresponding to the processed resource; receive a third trigger request for the second label from the user, send a resource acquiring request to the server according to the third trigger request and identification information of the processed resource, receive and store the resource returned from the server; and receive a fourth trigger request for the resource from the user, and display the resource according to the fourth trigger request.

If the resource is an installation package of an application program, the first processing module 200 is specifically configured to: extract and store feature information of the installation package, in which a storage space occupied by the feature information is less than that occupied by the installation package. The feature information of the installation package includes one or more of name, version number, size and MD5 of the installation package.

If the resource is an installation package of an application program, the device may also include a storage module (which is not shown in the drawings). The storage module is configured to establish and store a corresponding relationship between the feature information and the installation package of the application program.

Additionally, in order to provide convenience for the user to acquire and install the application program in the corresponding version again and to continuously experience the service provided by the application program in the corresponding version, the device may also include a sixth processing module (which is not shown in the drawings). The sixth processing module is configured to receive a fifth trigger request for the first label from the user after the first generating module generates the first label corresponding to the resource deleted; send an installation package acquiring request to the server according to the fifth trigger request and the corresponding relationship established, receive and store the installation package of the application program returned from the server; and receive a sixth trigger request for the installation package of the application program from the user, re-install the installation package of the application program according to the sixth trigger request.

It should be noted that the illustration of the above embodiments of the method for cleaning up a terminal resource is also suitable for the embodiments of the device for cleaning up a terminal resource, which is not described herein.

The device for cleaning up a terminal resource according to an embodiment of the present disclosure may receive a cleanup instruction and acquire a resource stored in a terminal according to the cleanup instruction by the acquiring module, process the resource and store the processed resource occupying a storage space less than that occupied by the resource by the first processing module, and query by the second processing module whether the resource is stored in a server, display a deleting prompt message if the resource is stored in the server and delete the resource according to an operation executed by a user. Thus, the storage space of the terminal occupied by a resource can be greatly reduced, and at the same time, convenience can be provided for a user to redisplay the resource since it is guaranteed that the corresponding resource is stored in a server before the resource is deleted.

In order to implement the above embodiments, the present disclosure also provides a mobile terminal. The mobile terminal includes: a shell, a processor, a memory, a circuit board and a power supply circuit, in which the circuit board is located in a space formed by the shell, the processor and the memory are arranged on the circuit board; the power supply circuit supplies power for each circuit or component in the mobile terminal; the memory stores executable program codes; the processor executes a program corresponding to the executable program codes by reading the executable program codes stored in the memory so as to execute the followings.

In act S101', a cleanup instruction is received and a resource stored in a terminal is acquired according to the cleanup instruction.

In an embodiment of the present disclosure, the terminal may be a personal computer, a phone, a tablet computer or other hardware devices configured with various operating systems.

Specifically, the resource stored in the terminal under different paths may be acquired according to the cleanup instruction, after the cleanup instruction is received, in which the resource may include but is not limited to one or more of an image, an audio and a video.

In act S102', the resource is processed, and a processed resource is stored, in which a storage space occupied by the processed resource is less than that occupied by the resource.

Specifically, different types of resources may be processed in different ways after the resource stored in a terminal is acquired. Specifically, if the resource is an image, the image may be zoomed out. For example, the image may be zoomed out to acquire a thumbnail image corresponding to the image.

If the resource is an audio or a video, the audio or the video may be compressed. For example, if the resource is a 1080P high-definition video 1, the 1080P high-definition video 1 may be compressed. For example, the video 1 may be compressed as a 480P video 1, and the processed video, i.e. the 480P video 1, may be stored in the terminal.

By processing the resource and storing the processed resource, the storage space occupied by the processed resource is far less than that occupied by the original resource, and the storage space of the terminal occupied by the resource may be greatly reduced by storing the processed resource in the terminal.

In act S103', it is queried whether the resource is stored in a server, if the resource is stored in the server, then a deleting prompt message is displayed, and the resource is deleted according to an operation executed by a user.

Specifically, after the processed resource is stored, a query request may be sent to a server according to identification information of the processed resource. The server receives the query request sent by the terminal and queries whether a corresponding resource is stored in the server according to the identification information in the query request. If there is the corresponding resource stored in the server, the querying result indicating that the corresponding resource is stored in the server may be returned to the terminal. If the terminal determines that there is the corresponding resource stored in the server according to the querying result, a deleting prompt message may be displayed on the terminal and the corresponding resource may be deleted according to the operation executed by a user.

In this embodiment, if there is no resource stored in the server, a resource may be uploaded to the server so as to ensure that the serve has the resource stored therein.

Specifically, if the corresponding resource is not found by the server according to the query request, i.e., there is no corresponding resource stored in the server, the querying result indicating that the corresponding resource is not stored in the server may be returned to the terminal. When the terminal receives the querying result and determines that the corresponding resource is not stored in the server, a processed resource may be uploaded to the server so as to ensure that the server has the processed resource stored therein.

For example, assume that the corresponding resource stored in the terminal is a 1080P high-definition video 1, and the processed resource after compression is a 480P video 1. If it is detected that the corresponding 1080P high-definition video 1 is not stored in the server, the 1080P high-definition video 1 may be uploaded to the server so as to ensure that the server has the 1080P high-definition video 1 stored therein. The prompt message of deleting the 1080P high-definition video 1 is displayed on the terminal thereafter, and at this moment, the terminal may delete the corresponding 1080P high-definition video 1 according to the operation executed by a user. Thus, before the 1080P high-definition video 1 is cleaned up, it is ensured that the original 1080P high-definition video 1 is stored in the server, such that it is convenient for the user to acquire the high-definition video from the server again when the user needs to watch the 1080P high-definition video 1 later.

Additionally, in order to ensure the security of the resource, the resource may be encrypted firstly, and then the encrypted resource may be uploaded to the server.

In this embodiment, after determining the corresponding resource is stored in the server, a prompt message for deleting may be displayed on the terminal, and when the resource is deleted according to the operation executed by the user, a first label corresponding to the deleted resource may be generated, such that the user may trigger the first label to acquire the corresponding resource again. Thus, it is convenient for the user to acquire a rough resource from the server again and check the rough resource in anytime.

In this embodiment, after the first label corresponding to the deleted resource is generated, if the user needs to redisplay the resource, the terminal may display the corresponding resource for the user. The redisplaying process is described as follows:

In act S21', a first trigger request for the first label from a user is received.

Specifically, when the user needs to check the rough resource, the user may trigger the first label corresponding to the resource, and the terminal receives the first trigger request for the first label corresponding to the resource from the user.

In act S22', a resource acquiring request is sent to the server according to the first trigger request and identification information of the processed resource, and the resource returned from the server is received and stored.

Specifically, a first trigger request for the first label corresponding to the resource from a user is received, and the terminal may receive identification information of the processed resource, and then send a resource acquiring request containing the first trigger request and the identification information of the processed resource to the server. The server receives the resource acquiring request, acquire the resource corresponding to the processed resource according to the identification information contained in the resource acquiring request (i.e., the rough resource is acquired), and return the acquired corresponding resource to the terminal. The terminal receives and stores the rough resource returned from the server.

Additionally, if the terminal uploads an encrypted resource, the server may acquire the encrypted resource according to the resource acquiring request and return the encrypted resource to the terminal. The terminal receives the encrypted resource returned from the server and decrypts the encrypted resource through a cryptogram and stores the decrypted resource in the terminal.

For example, when a user needs to watch the 1080P high-definition video 1, after the user clicks and processes the first label corresponding to the processed 480P video 1, a terminal receives a first trigger request for the first label from the user, acquires identification information of the processed video 1, and sends a resource acquiring request containing the first trigger request and the identification information to the server. The server receives the resource acquiring request sent by the terminal, acquires the 1080P high-definition video 1 stored therein according to the identification information in the resource acquiring request, and returns the corresponding 1080P high-definition video 1 to the terminal. The terminal receives and stores the returned 1080P high-definition video 1.

In act S23', a second trigger request for the returned resource from the user is received, and the resource is displayed according to the second trigger request.

After the terminal acquires the rough resource, if a user triggers the second trigger request for the resource (i.e. a request for displaying the resource), the terminal may display the corresponding rough resource according to the trigger operation of the user. Thus, the user may redisplay the rough resource.

For example, the rough resource acquired by the terminal is a 1080P high-definition video 1, when the user clicks the 1080P high-definition video 1 stored in the terminal, the terminal may play the high-definition video 1 according to the trigger operation of the user.

Additionally, in this embodiment, if the resource is an audio or a video, after the first label corresponding to the deleted resource is generated, the resource stored in the server may be directly played on the server according to the trigger operation of the user. Specifically, the terminal receives a first trigger request for the first label from the user, plays the resource in the server according to the first trigger request and the established identification information of the processed resource. Thus, it is convenient for checking the resource stored in the server online and the terminal storage space occupied by the corresponding resource is reduced.

Additionally, in this embodiment, after the processed resource is stored, a second label corresponding to the processed resource is generated, such that the user may trigger the second label for acquiring the corresponding resource.

Specifically, in the process of checking the processed resource stored in a terminal by a user, the terminal may receive a checking request for the corresponding processed resource from the user and display the corresponding processed resource according to the checking request. In the process of checking the corresponding processed resource by the user, the terminal may receive a third trigger request for the second label corresponding to the processed resource from the user, send a resource acquiring request to the server according to the third trigger request and the identification information of the processed resource. The server may acquire the corresponding resource according to the identification information in the resource acquiring request and return the corresponding resource to the terminal. The terminal may receive and store the resource returned from the server. If the user triggers a fourth trigger request for the corresponding resource (i.e. a displaying request), the terminal may receive the fourth trigger request for the returned corresponding resource from the user, and display the corresponding resource according to the fourth trigger request. The above identification information of the processed resource may information uniquely identifying the resource. For example, the identification information may be a name of an image, an audio and a video etc., or may be other information which could identify the resource.

For example, a 1080P high-definition video 1 is existed in a terminal, an animation file 1 may be made by using various static images in the video 1, and the animation file 1 may be stored in the terminal as a processed resource of the video 1. In the process of playing the animation file 1, if the user is interested in one of the static images, the user may click a second label in the animation file 1, and after the user clicks the second label, the terminal may acquire the 1080P high-definition video 1 for the user to check. Specifically, the terminal may acquire the third trigger request from the user and the identification information corresponding to the animation file 1, and send a resource acquiring request to the server. The server man acquire the 1080P high-definition video 1 stored therein according to the identification information in the resource acquiring request, and return the corresponding 1080P high-definition video 1 to the terminal. The terminal may receive and store the corresponding 1080P high-definition video 1 returned from the server. When the user clicks the video 1, the terminal receives a displaying request from the user, and plays the 1080P high-definition video 1 for the user.

If the resource is an installation package of an application program, the processor may also execute the followings.

In act S301', a cleanup instruction is received and the installation package of application program existed in a terminal is acquired according to the cleanup instruction.

In this embodiment, the terminal may be a personal computer, a phone, a tablet computer or other hardware devices configured with various operating systems.

Specifically, after the cleanup instruction is received, a corresponding version of the installation package of the application program may be acquired through different information sources. For example, the terminal may be a smart phone base on Android system. A user downloads five application programs through Baidu application store and three application programs through SnapPea application store. After the user triggers a cleanup button, a cleanup instruction may be received, and the installation packages of the eight application programs downloaded via a management software such as Baidu application store and SnapPea application store may be acquired.

In act S302', feature information of the installation package may be extracted and stored, in which a storage space occupied by the feature information is less than that occupied by the installation package.

Specifically, after the installation package of the application program existed in a terminal is acquired, the feature information of the installation package may be directly extracted and stored, or after the installation package of the application program is installed successfully on the terminal, the feature information of the installation package may be extracted and stored, in which the feature information of the installation package includes but is not limited to one or more of name, version number, size and MD5 of the installation package, and the feature information of the installation package extracted and stored by the server only occupies dozens of bytes, and compared to the installation package of the application program which occupies several MBytes of the storage space of the terminal, the space occupancy may be reduced effectively by only storing the feature information of the application program in the terminal.

Additionally, if it is detected that the installation package of the application program is not installed, a prompt message may be displayed on the terminal such that it is convenient for user to install the corresponding application program according to the prompt message. After the corresponding application program is installed, the feature information of the installation package of the corresponding application program may be extracted and stored. However, after the prompt message is displayed on the terminal, if the user decides not to install the application program, the feature information of the installation package of the corresponding application program may be directly extracted and stored.

In act S303', it is queried whether the installation package of the application program is stored in a server, if the installation package of the application program is stored in the server, then a deleting prompt message is displayed, and the installation package of the application program is deleted according to an operation executed by a user.

Specifically, after the feature information of the installation package of the corresponding application program is extracted and stored, a querying request may be sent to the server according to the feature information of the installation package. The server receives the querying request sent by the terminal and queries whether the installation package of the corresponding application program is stored therein according to the feature information contained in the querying request, i.e., it is queried whether an installation package in accordance with the downloaded installation package is stored in the server. If the installation package of the corresponding application program is stored in the server, the querying result indicating that the installation package of the corresponding application program is stored in the server may be returned to the terminal. If the terminal determines that there is an installation package of the corresponding application program stored in the server according to the querying result, a deleting prompt message may be displayed on the terminal and the installation package of the application program may be deleted according to the operation executed by a user.

In this embodiment, if the installation package of the application program is not stored in the terminal, the installation package of the application program may be uploaded to the server so as to ensure that the server has the installation package of the application program stored therein.

Specifically, if the installation package of the corresponding application program is not found by the server according to the querying result, which means that there is no installation package of the corresponding application program stored in the server, the querying result indicating that the installation package of the corresponding application program is not stored in the server is returned to the terminal. The terminal receives the querying result and uploads the installation package of the corresponding application program to the server when determining that the installation package of the corresponding application program is not stored in the server, so as to ensure that the server has the installation package of the corresponding application program stored therein.

For example, assume that the installation package of the corresponding application program stored in the terminal is an installation package of QQ in version 4.6.1. If it is detected that the installation package of QQ in this version is not stored, the installation package of QQ in version 4.6.1 may be uploaded to the server firstly so as to ensure the server has the installation package of QQ in this version stored therein. A prompt message of deleting the installation package of QQ may be displayed on the terminal thereafter, while the terminal may delete the corresponding installation package of QQ according to the operation executed by the user. In this way, it is guaranteed that the server has the installation package of QQ stored therein while cleaning up the installation package of QQ, such that it is convenient for the user to re-download and install the installation package of QQ in the corresponding version as needed later In this embodiment, after determining the installation package of the corresponding application program is stored in the server, the prompt message of deleting the installation package may be displayed on the terminal and the installation package may be deleted according to the operation executed by the user. When deleting the installation package of the corresponding application program, a label corresponding to the deleted installation package of the corresponding application program may be generated, and the user may acquire the installation package of the corresponding application program again by triggering the label corresponding to the installation package. Thus, the operation of the user for querying and downloading the installation package of the application program in a corresponding version from network may be reduced, the efficiency of acquiring by the user the installation package of the application program in the corresponding version may be improved, such that it is convenient for the user to install the application program in the corresponding version.

In this embodiment, after generating the label corresponding to the deleted installation package of the application program, if a user needs to re-install the corresponding application program, the followings may be executed.

In act S41', a first trigger request for the label from a user is received.

Specifically, when the user needs to re-install an application program, a label corresponding to the application program may be triggered by the user and the terminal may receive a first trigger request for the label from the user.

In act S42', an installation package acquiring request is sent to the server according to the first trigger request and feature information, the installation package of the application program returned from the server is received and stored.

Specifically, after the first trigger request from the user is received, the terminal may acquire the feature information corresponding to the application program, and send an installation package acquiring request containing the first trigger request and the feature information to the server. The server receives the acquiring request, acquires the installation package of the corresponding application program according to the feature information in the acquiring request, and returns the installation package of the corresponding application program to the terminal. The terminal receives and stores the installation package of the corresponding application program returned from the server.

In act S43', a second trigger request for the installation package of the corresponding application program from the user is received, and the installation package of the corresponding application program is re-installed according to the second trigger request.

After the terminal acquires the installation package of the corresponding application program, if the user triggers the second trigger request (i.e. an installing request) for the installation package of the corresponding application program, the terminal may re-install the installation package of the corresponding application program according to the trigger operation of the user, so as to allow the terminal to install the application program in the corresponding version quickly. It is convenient for user to continuously experience the service provided by the application program in the corresponding version.

Additionally, in this embodiment, after the feature information of the installation package of the corresponding application program is extracted and stored, the corresponding relationship between the feature information and the installation package of the application program is established and stored. The information of the installation package corresponding to the feature information may be acquired quickly through the established corresponding relationship. Thus, the installation package of the corresponding application program may be acquired quickly and conveniently.

If the corresponding relationship between the feature information and the installation package of the application program is stored in the terminal, after generating the label corresponding to the deleted installation package of the application program, the re-installation of the corresponding application program may be realized as follows.

In act S51', a first trigger request for the label from the user is received.

The act S51' is the same as the act S41', the illustration of the act S41' is suitable for the act S51', which is not described herein.

In act S52', an installation package acquiring request is sent to the server according to the first trigger request and the established corresponding relationship, the installation package of the application program returned from the server is received and stored.

Specifically, after the first trigger request from the user is received, the terminal may acquire the corresponding relationship between the feature information and the installation package of the application program, and send an installation package acquiring request to the server according to the first trigger request and the established corresponding relationship. The server receives the acquiring request, acquires the installation package of the corresponding application program according to the corresponding relationship in the acquiring request, and returns the installation package of the corresponding application program to the terminal. The terminal receives and stores the installation package of the corresponding application program returned from the server.

In act S53', a second trigger request for the installation package of the corresponding application program from the user is received, and the installation package of the corresponding application program is re-installed according to the second trigger request.

The act S53' is the same as the act S43', the illustration of the act S43' is suitable for the act S53', Which is not described herein.

The terminal according to an embodiment of the present disclosure may receive a cleanup instruction and acquire a resource stored in a terminal according to the cleanup instruction, and then process the resource and store the processed resource occupying a storage space less than that occupied by the resource, and query whether the resource is stored in a server, and then display a deleting prompt message if the resource is stored in the server and delete the resource according to an operation executed by a user. Thus, the storage space of the terminal occupied by a resource can be greatly reduced, and at the same time, convenience can be provided for a user to redisplay the resource since it is guaranteed that the corresponding resource is stored in a server before the resource is deleted.

Reference throughout this specification to "an embodiment", "some embodiments," "an embodiment", "a specific example," or "some examples," means that a particular feature, structure, material, or characteristic described in connection with the embodiment or example is included in at least an embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the acts of the progress. And the scope of a preferred embodiment of the present disclosure includes other implementations in which the order of execution may differ from that which is depicted or discussed in the flow chart, including in a basic same time manner or in reverse order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, if it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the acts in the method of the above embodiments can be implemented by instructing related hardware via programs, the program may be stored in a computer readable storage medium, and the program includes one act or combinations of the acts of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be read-only memories, magnetic disks, or optical disks.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for cleaning up a terminal resource, comprising:
    receiving a cleanup instruction, and acquiring a resource stored in a terminal according to the cleanup instruction;
    processing the resource, and storing a processed resource, wherein a storage space occupied by the processed resource is less than a storage space occupied by the resource;
    querying whether the resource is stored in a server;
    if the resource is not stored in the server, uploading the resource to the server so as to enable the resource to be stored in the server;
    if the resource is stored in the server, displaying a deleting prompt message, and deleting the resource according to an operation executed by a user, the deleting the resource comprising generating a first label corresponding to the resource deleted, such that the user is able to trigger the first label to acquire the resource again;
    receiving a first trigger request for the first label from the user;
    sending a resource acquiring request to the server according to the first trigger request and identification information of the processed resource, receiving and storing the resource returned from the server; and
    receiving a second trigger request for the resource from the user, and displaying the resource according to the second trigger request.

2. The method according to claim 1, wherein if the resource is an audio or a video, after generating the first label corresponding to the resource deleted, the method further comprises:
    playing the resource stored in the server according to the first trigger request and identification information of the processed resource.

3. The method according to claim 1, further comprising:
    generating a second label corresponding to the processed resource, such that the user is able to trigger the second label to acquire the resource.

4. The method according to claim 3, further comprising:
    receiving a checking request for the processed resource from the user, and displaying the processed resource according to the checking request;
    receiving a third trigger request for the second label from the user, sending a resource acquiring request to the server according to the third trigger request and identification information of the processed resource, and receiving and storing the resource returned from the server; and
    receiving a fourth trigger request for the resource from the user, and displaying the resource according to the fourth trigger request.

5. The method according to claim 1, wherein the uploading the resource to the server comprises:
    encrypting the resource, and uploading an encrypted resource to the server; and
    the receiving and storing the resource returned from the server comprises: receiving the encrypted resource returned from the server, and decrypting the encrypted resource, and storing the resource decrypted.

6. The method according to claim 1, wherein,
    if the resource is an image, the processing the resource comprises zooming out the image;
    if the resource is an audio or a video, the processing the resource comprises compressing the audio or the video;
    if the resource is an installation package of an application program, the processing the resource and storing a processed resource comprises: extracting and storing feature information of the installation package, wherein a storage space occupied by the feature information is less than a storage space occupied by the installation package, and the feature information of the installation package comprises at least one of a name, a version number, a size, and an MD5 of the installation package.

7. The method according to claim 6, wherein, if the resource is the installation package of the application program, the method further comprises:
    establishing and storing a corresponding relationship between the feature information and the installation package of the application program;
    receiving a third trigger request for the first label from the user;
    sending an installation package acquiring request to the server according to the fifth trigger request and the corresponding relationship established, and receiving and storing the installation package of the application program returned from the server; and
    receiving a fourth trigger request for the installation package of the application program from the user; and re-installing the installation package of the application program according to the sixth trigger request.

8. A device for cleaning up a terminal resource, comprising:
- a processor; and
- a memory, configured to store instructions executable by the processor;
- wherein, the processor is configured to:
  - receive a cleanup instruction and to acquire a resource stored in a terminal according to the cleanup instruction;
  - process the resource and store a processed resource, wherein a storage space occupied by the processed resource is less than a storage space occupied by the resource; and
  - query whether the resource is stored in a server, to display a deleting prompt message if the resource is stored in the server, and to delete the resource according to an operation executed by a user;
  - after querying whether the resource is stored in a server, the processor is further configured to upload the resource to the server so as to enable the resource to be stored in the server;
  - generate a first label corresponding to the resource deleted when deleting the resource, such that the user is able to trigger the first label to acquire the resource again; and
  - after generating the first label corresponding to the resource deleted, the processor is further configured to:
  - receive a first trigger request for the first label from the user; send a resource acquiring request to the server according to the first trigger request and identification information of the processed resource, receive and store the resource returned from the server; and receive a second trigger request for the resource from the user, and display the resource according to the second trigger request.

9. The device according to claim 8, wherein if the resource is an audio or a video, after generating the first label corresponding to the resource deleted, the processor is further configured to play the resource stored in the server according to the first trigger request and established identification information of the processed resource.

10. The device according to claim 8, wherein, the processor is further configured to:
- generate a second label corresponding to the processed resource, such that the user is able to trigger the second label to acquire the resource.

11. The device according to claim 10, wherein, the processor is further configured to:
- receive a checking request for the processed resource from the user and display the processed resource according to the checking request; receive a third trigger request for the second label from the user, send a resource acquiring request to the server according to the third trigger request and identification information of the processed resource, receive and store the resource returned from the server; and receive a fourth trigger request for the resource from the user, and display the resource according to the fourth trigger request.

12. The device according to claim 8, wherein, the processor is configured to:
- upload the resource to the server by encrypting the resource, and upload an encrypted resource to the server; and
- receive and store the resource returned from the server by receiving the encrypted resource returned from the server and decrypting the encrypted resource, and storing the resource decrypted.

13. The device according to claim 8, wherein,
- if the resource is an image, the processor is configured to process the resource by zooming out the image;
- if the resource is an audio or a video, the processor is configured to process the resource by compressing the audio or the video;
- if the resource is an installation package of an application program, the processor is configured to process the resource and store a processed resource by acts of: extracting and storing feature information of the installation package, wherein a storage space occupied by the feature information is less than a storage space occupied by the installation package, and the feature information of the installation package comprises at least one of a name, a version number, a size, and an MD5 of the installation package.

14. A mobile terminal, comprising: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to:
- receive a cleanup instruction, and acquire a resource stored in a terminal according to the cleanup instruction;
- process the resource, and store a processed resource, in which a storage space occupied by the processed resource is less than that occupied by the resource;
- query whether a resource is stored in a server, if the resource is not stored in the server, uploading the resource to the server so as to enable the resource to be stored in the server;
- if the resource is stored in the server, display a deleting prompt message, and delete the resource according to an operation executed by a user, the deleting the resource comprising generating a first label corresponding to the resource deleted, such that the user is able to trigger the first label to acquire the resource again;
- receiving a first trigger request for the first label from the user;
- sending a resource acquiring request to the server according to the first trigger request and identification information of the processed resource, receiving and storing the resource returned from the server; and
- receiving a second trigger request for the resource from the user, and displaying the resource according to the second trigger request.

* * * * *